United States Patent [19]
Pao et al.

[11] 3,842,372
[45] Oct. 15, 1974

[54] EXTREMELY FAST GASEOUS STARK FIELD LIGHT MODULATORS AND Q-SWITCHED LASER FOR THE INFRARED WAVELENGTH REGION

[75] Inventors: Yoh-Han Pao, Cleveland Heights; Paul C. Claspy, Middleburg Heights, both of Ohio

[73] Assignee: Data Optics Corporation

[22] Filed: Aug. 22, 1972

[21] Appl. No.: 282,821

Related U.S. Application Data

[63] Continuation of Ser. No. 54,713, Aug. 14, 1970, abandoned.

[52] U.S. Cl. ................ 332/7.51, 350/160, 331/94.5
[51] Int. Cl. ............................................. H01s 3/10
[58] Field of Search .................... 330/4.3; 332/7.51; 350/160; 250/199

[56] References Cited
OTHER PUBLICATIONS

Landman, "Modulation of the 3.39$\mu$ Ne Line by Electro-Optic Gasses," 8/67, pg. 3668–3675, J.A.P., Vol. 38, No. 9.

Landman et al., "Light Modulation ... Application to $CO_2$ Lasers," 12/1/69, pg. 357–360, A.P.L., Vol. 15, No. 11.

Landman et al., "Electro–Optic Modulator ... of the Stark Effect in Molecular Gases," 6/69, pg. 330, IEEE, J.Q.E., No. 7.4.

*Primary Examiner*—Malcolm F. Hubler
*Assistant Examiner*—N. Moskowitz
*Attorney, Agent, or Firm*—Sughrue, Rothwell, Mion, Zinn & Macpeak

[57] ABSTRACT

An infrared light intensity modulator utilizing the electro-optical Stark effect at high modulating frequencies in molecular gases having non-linear molecules with permanent dipole moments. Modulating frequencies greater than 0.5 MHz are obtainable for the first time. A D.C. bias field superimposed on the modulating field enhances the Stark effect and changes the frequency of the modulated output. Also, a cell utilizing this Stark effect is used as an active electrooptical element in a laser cavity to form a novel Q-switched laser to produce high energy laser pulses of short duration.

14 Claims, 12 Drawing Figures

$$\omega' = \frac{\mu E}{h} \frac{M}{J(J+1)} \quad \text{for } \triangle J=0, \triangle M=0, \triangle K=\pm 1$$

INVENTORS
YOH-HAN PAO
PAUL C. CLASPY

BY Sughrue, Rothwell, Mion, Zinn & Macpeak
ATTORNEYS

EXTREMELY FAST GASEOUS STARK FIELD LIGHT MODULATORS AND Q-SWITCHED LASER FOR THE INFRARED WAVELENGTH REGION

This is a continuation, of application Ser. No. 54,713, filed July 14, 1970, and now abandoned.

BACKGROUND OF THE INVENTION

1. Field of the Invention

This invention relates generally to the field of electro-optic light modulators and more particularly to an improved gaseous Stark effect modulator and an improved Q-switched laser operating in the infrared region.

2. Description of the Prior Art

In modern communications systems and industrial control systems, it is necessary to vary the amplitude or frequency of a light beam at high rates, up to switching times of the order of millimicroseconds. Many light controlling devices are known, and these are all of use in appropriate application contexts. Mechanical or electromechanical light choppers, electrically driven tuning forks, acousto-optical light deflectors, magneto-optic Faraday effect devices, electrooptic Kerr cells and mirrors mounted on piezoelectric crystal stacks may all be used for switching light for switching times up to microseconds. It is interesting, however, that none of these can be used for faster switching rates without the use of enormously large driving power.

To date, the electro-optic modulators using the pockels effect have been by far the most successful high rate modulators for light in the visible range. In these modulators, the birefringence (different refractive index for different directions) of a crystal is changed by an applied electric field to form the basis for various control schemes. In one type of modulation, the electro-optic (birefringent) crystal is placed in the path of the light beam. Two light polarizers are also used, both of them in the path of the light beam, one before the electro-optic crystal and one after. The first polarizer polarizes the light. On passing through the crystal, the linearly polarized light is transformed into elliptically polarized light, and only the appropriate component of it passes through the second polarizer acting as an analyzer. As the electric field is changed, the degree of ellipticity is changed, and the amount of light transmitted through the analyzer is correspondingly changed. These crystal Pockels effect modulators can be driven at very high rates but require a great deal of modulation power. Furthermore, it is difficult to obtain crystals of suitable size and of good optical quality, especially for use in the infrared spectral region.

The Pockels effect may also be used for the frequency modulation of lasers. The precise frequency at which a laser operates depends upon the optical length of the cavity. In the frequency modulation of a laser output, the crystal is inserted in the cavity of the laser. Then, as the applied electric field is varied, the refractive index of the crystal is changed and, correspondingly, so is the optical length of the cavity. The net effect is that the frequency of the laser output is changed in accordance with the applied electric field. The disadvantages of such Pockels effect devices are that insertion losses are very large and temperature changes in the crystal cause uncontrolled frequency fluctuations and beam steering. These problems again appear in aggravated form in the infrared region where it is difficult to obtain good crystals of GaAs and CdTe of sufficiently low optical loss, low electrical conductivity and high mechanical strength for operation in this region.

There is another electro-optic effect which depends upon the change in the absorption coefficient of the material rather than in the refractive index. This effect is commonly called the Stark effect. The usual Stark effect is manifested as a change in the wavelength of some absorption line as a strong electric field is applied to the material. Sometimes the effect is manifested as a splitting of the original absorption line into several lines, and at other times there may be shifts in position also.

Although such effects have been studied in gases in the cases of atomic spectra and microwave spectra of molecules, there has hitherto essentially been no practical application of the Stark effect. The one known exception is that described in U.S. Pat. No. 3,238,843. The modulation system described there consists of a thin layer of a light transmitting material, and a pair of transparent conductive electrodes in surface-to-surface contact with opposite sides of the thin layer of material. This prior system is really based on the rather small shift of the exciton band structure in crystals. This shift usually appears in the ultraviolet wavelength region and actually occurs in only a few crystals and at very specific wavelengths. Such Stark-shifted absorption features are usually accompanied a broad absorption base, and there is therefore quite a bit of optical loss in those devices. While operable perhaps as logic elements in an optical computer system, the devices taught in U.S. Pat. No. 3,238,843 are of limited use in communications systems because of high insertion loss, the small depth or degree of modulation and the very limited wavelength region in which these devices can be operated. In fact, the patented system, i.e., one comprising a thin layer of a light transmitting (electro-optic) material and a pair of transparent conductive electrodes in surface-to-surface contact with opposite sides of the thin layer of material, is inoperable in the infrared region, for the simple reason that light transparency and good electrical conductivity are mutually exclusive in the infrared region. This result is due to free electron absorption of light. In addition, there are no suitable exciton bands in the infrared region. It is interesting to note that the devices taught in U.S. Pat. No. 3,238,843 are based on choice of a crystal, and then the wavelength of the light to be modulated is chosen accordingly to be just right for control by the small Stark effect in that specific portion of the absorption spectrum. Furthermore, very high electric fields on the order of kilovolts/cm are required.

In the literature, the possibility of using the Stark effect in molecular gases for electro-optic modulation of $CO_2$ lasers has been discussed in the following published articles:

1. A. Landman and H. Marantz, "Electrooptic Modulation of the $CO_2$ Laser By Means of the Stark Effect in Molecular Gases," 1969 IEEE Conference on Laser Engineering and Applications, May 1969.

2. A. Landman, H. Marantz, and Vincent Early, "Light Modulation by Means of the Stark Effect in Molecular Gases - Application to $CO_2$ Lasers," *Applied Physics Letters* 15, 357 (1969)

These authors demonstrated that the Stark effect for low frequency electric fields (i.e., up to 250 Hz) could indeed be used to control the output of a $CO_2$ laser using Stark cells containing methyl halides or ammonia. However, even though they used very high A.C. electric fields (typically over 1 kilovolt/cm), they could obtain only very small depth or degree of modulation, of the order of fractions of a percent per centimeter. The line most efficiently modulated, namely the P(26) line of the 9.6 micron transition of the $CO_2$ laser is an inefficient line insofar as gain and intensity are concerned. These authors did not consider Stark effect modulators operating with low electric fields at higher frequencies to yield large depths of modulation or the use of a D.C. field to increase the depth of modulation and to change the modulated output from amplitude to intensity modulation.

In the operation of lasers, it is sometimes desirable to be able to concentrate the available laser energy in pulses of short duration. In this way, pulses of high peak power are obtained even though the average laser power may be much lower. To achieve this type of operation, the loss of the laser cavity is made normally to be large so that the laser does not operate (Q-spoiling). The inverted population can be built up so that, when the loss is suddenly decreased (Q-switching), the laser dumps all the stored energy into one pulse of high peak power and short duration. For solid state lasers, such as the ruby and YAG lasers, repetitive Q-switching is done mechanically with rotating mirrors or prisms. Saturable dyes also work for a limited number of pulses but only in a passive manner, that is, the rate of repetition cannot be adjusted. For gas lasers, no active, i.e., driven, intracavity loss modulators, other than mechanical ones, are known in the prior art; in the prior art, gas lasers could not be Q-switched in a controlled manner.

In the prior art, high peak power laser pulses were obtained only by using large high average power lasers operating at about 4 percent efficiency.

SUMMARY OF THE INVENTION

We have invented an infrared gaseous Start effect modulator which operates at modulating frequencies or switching rates in excess of 0.5 MHz, which frequencies or rates greatly exceed those available in prior art devices which operated at much lower frequencies or rates also easily obtained by mechanical means.

We have now found that, for appropriate pressure conditions and suitable gases, very large depths of modulation can be obtained with low fields. In addition, we have found that there are two different frequency regions for which different Stark effect responses may be obtained. The lower frequency region, wherein the modulating frequency is within the homogeneous linewidth of the absorbing radiation, is linear and is not frequency dependent. The higher frequency region (A.C. Stark effect) is obtained whenever the modulating frequency exceeds the (saturated) homogeneous linewidth of the absorbing transition.

More particularly, we have found molecular gases having permanent dipole moments and which are suitable for modulating the lines of the $CO_2$ laser which are more important insofar as gain, efficiency and intensity of output are concerned. Generally speaking, these lines are the P(16) to P(24) lines of the 10.6 micron transition of the $CO_2$ laser. In addition, the use of a D.C. bias field for increasing the Stark effect, as well as for changing the nature of the modulation from amplitude to intensity modulation, is taught by this invention.

It is therefore the primary object of the present invention to provide a fast gaseous Stark light modulator in the infrared wavelength region with a bandwidth from 0.5 MHz up to about 100 megaHz, using low electric fields and either an A.C. modulating field or a combination of A.C. field with a D.C. bias field, where the A.C. frequency is within the linewidth of the natural absorption line of the gas. There is little optical loss in this modulator in the transmitting state, and there is no frequency dependence of the depth of modulation so that linear modulation can be obtained.

It is another important object of the invention to provide a Q-switched gas laser with the Q-switching rate controlled by an active intra-cavity Stark effect loss modulator and variable up to several hundred kiloHz to produce high energy laser pulses of short duration.

Another object is to provide a relatively small, low average power Q-switched laser operating at high efficiency (approximately 80 percent) to produce short laser pulses with high peak power.

It is another object of the invention to provide an extremely fast light switch in the infrared wavelength region using the A.C. Stark effect in molecular gases. In this particular case, the modulating frequency is considerably higher than the linewidth of the natural absorption line of the gas, and the response is non-linear. The switch is typically suitable for on-off operation for digital communications and control systems.

It is another object of the invention to provide a thermal printing system suitable for rapid printing on ordinary paper.

The present invention may be summarized generally as a novel system and method for controlling the transmission of a beam of light in the infrared region, and more particularly as such a system and method wherein the light beam is controlled by applying a controllable A.C. or D.C. electric field to a volume of a gas exhibiting the Stark effect and interposed in the path of the beam.

The objects of the present invention are accomplished in general by an optical system comprising a substantially monochromatic light source, a means for receiving or detecting light therefrom, and an electric field controllable gaseous Stark effect light cell interposed between the source and the light detecting or receiving means, and power supply means for selectively applying an electric field across the gas cell.

In the preferred form of the invention, for any monochromatic infrared light beam, a molecular gas of symmetric top or asymmetric top symmetry with a permanent dipole moment is selected so that the gas has a natural or unperturbed absorption line at or nearly at the frequency of the incident light. Variation of the voltage across the gas modulation cell changes the absorption coefficient of the molecular gas in the cell and, therefore, also changes the intensity of the light passing through the cell and reaching the receiving means. In one embodiment, the gaseous light modulator is operated without net D.C. bias, and in this case the intensity of the transmitted light varies with twice the frequency of the modulation voltage, i.e., amplitude modulation. With a significant D.C. bias, i.e., such that there is no reversal in the polarity of the composite field applied to the gas, the transmitted intensity varies with the same frequency as the modulation voltage, i.e., intensity modulation. In the latter case, pulse modulation may be carried out in times of the order of a millimicrosecond. The modulating electric field may also be derived from rapidly switched D.C. voltage levels. In a second embodiment, the gas modulator acts as a Q-spoiler in the cavity of a laser to provide a Q-switched laser, and the laser is controlled at rapid rates by varying the loss in the cavity in this manner. In this case, the absorption is made sufficiently intense so that the modulation is not linear but is in the form of Q-switching. Both of these embodiments may be used in photo composition and heat printing systems.

In contrast to previous Pockels effect electro-optic light modulators, the present system utilizes gas rather than crystals which are expensive, of small optical aperture, high optical loss, and require high driving voltages to provide fields on the order of kilovolts/cm. For any incident monochromatic light in the infrared region, a suitable gas with nearly resonant absorption lines can be chosen so that driving voltages need not be large. In contrast to the prior art Stark modulator which uses a solid rather than a gas, the present invention does not depend on finding a suitable material for providing transparent conductive electrodes in the infrared region and, furthermore, is not limited to using monochromatic light sources at exactly the band edge of exciton lines in certain crystals.

The foregoing and other objects, features and advantages of the invention will be apparent from the following more particular description of preferred embodiments of the invention.

DESCRIPTION OF THE PREFERRED EMBODIMENTS

The following discussion is believed to be an accurate description of the physical theory involved in the operation of the present invention.

When a molecule absorbs a quantum of light, its electronic energy, vibrational energy, and rotational energy may all change. The optical transitions of interest to the present invention are those for which the rotational energy does change. Thus, the transitions themselves may be electronic-rotational, vibrational-rotational, or pure rotational. Not all molecules are suitable. In fact, the molecules must not be linear but may either be in the shape of a symmetric top or asymmetric top with a permanent dipole moment. In a gas such molecules do rotate but have a component of the permanent dipole moment which is fixed in space (in the absence of collisions). In the absence of an external electric field all orientations of that fixed component of the permanent dipole moment are equally probable. In a transition which involves a change in the rotational state, all such molecules absorb or emit at the same frequency (discounting for the effect of the Doppler shift) regardless of orientation.

Figure 1:
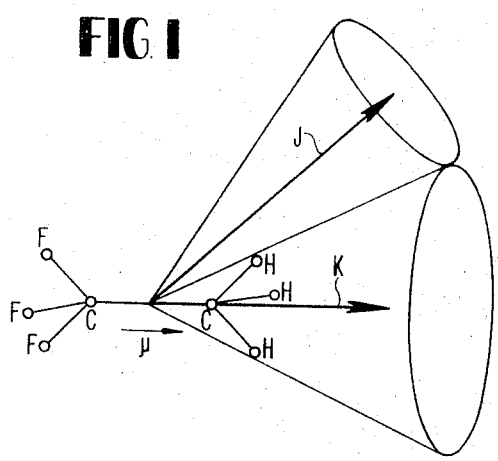
FIG. 1 is a schematic representation of the rotational motion of a symmetric top gas molecule (trifluoroethane)

To be specific, a molecule, such as trifluoroethane, may be rotating in a manner such that the total angular momentum $J$ remains fixed in space, but the rotation about the C—C axis $K$ precesses about $J$. The molecule thus has a space-fixed component of the permanent dipole moment along $J$. This motion for $CF_3CH_3$ is illustrated schematically in FIG. 1. The vector $J$, corresponding to the total angular momentum, remains fixed in space, but the molecule moves as if it were rolling without slipping around a cone constructed about $J$. The net result is that $K$ precesses about $J$. The projections of $J$ along any arbitrary direction, say the vertical, may be named $M$. Quantum mechanically it is known that $M$ can have the values $M = \pm J, \pm (J-1), \ldots 0$. In the absence of an electric field, absorption of a quantum of light may occur at a frequency $\omega_0$, as shown by the long solid central line 10 in FIG. 2a, and will correspond to an increase in vibrational energy as well as perhaps a change in the rotational energy. In the absence of an electric field, all the molecules absorb at the same frequency. However, in the presence of an electric field, the molecules with permanent dipole moment components in different directions have different energies. As a consequence, the D.C. Stark spectrum of a vibration-rotation absorption line consists of many split absorption lines corresponding to the different directions in which the original $J$ vector can be oriented in space. This direction is specified by means of the additional quantum number $M$, and in general, changes in energy levels (in frequency units) are related to the applied electric field by:

Level change $= (\mu E, MK/J(J+1)) \times$ Stark Constant where $\mu$ is the permanent dipole moment in Debyes, and $E$ is the applied field in volts/cm. The Stark constant is 0.50348 megaHz per Debye per volt/cm., and the change in energy level is given in megaHz.

Figure 2B:
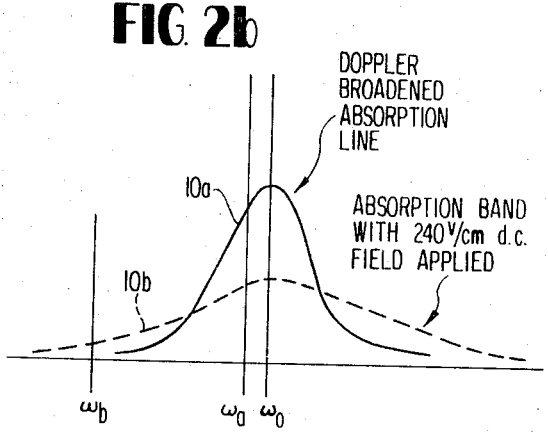
FIG. 2b shows the same D.C. Stark effect more realistically, i.e., when the absorption actually is in the form of a Doppler broadened band.
Figure 2A:
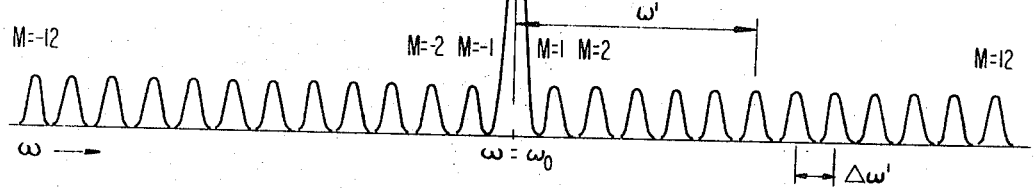
FIG. 2a illustrates the linear D.C Stark effect, i.e., the effect of a D.C. electric field on the absorption of the gas.

The Stark shift is then due to the difference of two such energy level changes. In particular, as illustrated in FIG. 2a, for a $\Delta J = 0, \Delta M = 0, \Delta K = +1$ transition with $J = 12$, the Stark spectrum would consist of 25 equally spaced absorption lines separated by $\Delta\omega'$ corresponding to the 25 different directions in which the original $J$ vector can be oriented in space.

For an applied D.C. field of 240 volts/cm. the equal frequency intervals $\Delta\omega'$ for trifluoroethane would be about 2.8 megaHz. The situation in an actual gas is not so clearcut because of the thermal motion of the gas molecules. When we look at a body of absorbing or emitting gas from any direction, the transition frequency of those molecules coming towards the observer is shifted up by an amount equal to $\Delta\omega = \omega_0(v/c)$, where $v$ is the thermal velocity of the gas, $\omega_0$ is the frequency of the center of the absorption line for a stationary molecule. Correspondingly, those molecules moving away from the observer have frequencies decreased. The absorption is therefore actually an inhomogeneously broadened line of say about 30 megaHz while the actual homogeneously broadened line width of each of the lines in that envelope may be of itself less than 1 megaHz at low pressures or very nearly 30 megaHz at slightly higher pressures. (Typically for polar molecules the homogeneous linewidth is of the order of 20 megaHz/mm Hg). This distinction is very important in the delineation of D.C. and A.C. Stark effects. In view of the inhomogeneous broadening, the actual D.C. Stark effect is therefore more realistically shown by the solid and dotted curves shown in FIG. 2b. The solid line 10a shows the Doppler broadened unsplit absorption line without any applied Stark field, and the dotted line 10b shows the same line when a Stark field of 240 volts/cm. is applied to the gas. Clearly, if the transmitted light is at frequency $\omega a'$ then application of an external field results in a decrease in absorption whereas for a light beam at frequency $\omega_b$, application of an external field results in an increase in absorption.

This D.C. Stark effect is linear and not frequency dependent and is obtained even for A.C. fields as long as the modulation frequency is smaller than the bandwidth of the homogeneous line. This is indeed fortunate because otherwise the phenomenon would be quite worthless for modulation of linear systems.

Figure 3A:
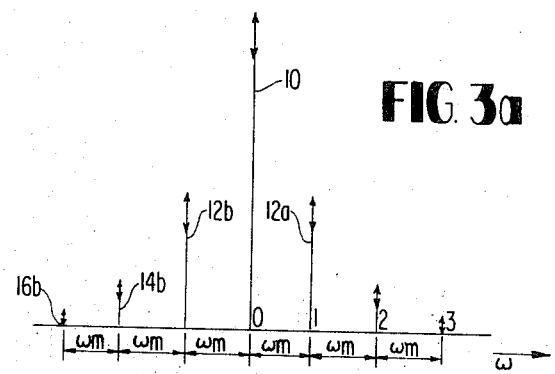
FIG. 3a illustrates the non-linear A.C. Stark effect.

According to another form of the present invention, once the A.C. frequency of the applied controlling or modulating field exceeds the homogeneous linewidth of the transition in the molecular gas, the Stark effect becomes non-linear and frequency dependent, and a significantly different spectrum is obtained. This form of the present invention is based on utilization of this A.C. spectrum. As depicted schematically in FIG. 3a, for each of the components with different M values, the A.C. spectrum consists of the original natural absorption line 10 and a series of side bands 12a, 12b, 14a, 14b, 16a, 16b seperated by the modulation frequency $\omega_m$ of the A.C. field. The absorption coefficients of each of those side bands are proportional to the square of the Bessel Functions, i.e., $$[J_n (\omega'/v)] \quad (2)$$

where $\omega'$ = D.C. Stark shifts (in frequency units) corresponding to a D.C. field equal to the A.C. peak voltage. (This varies with the different M values of the transition.)

Figure 3B:
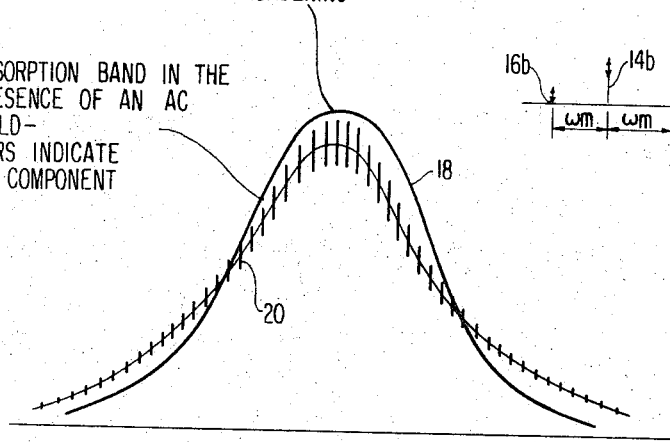
FIG. 3b shows the same A.C. Stark effect more realistically when the absorption is actually in the form of a Doppler broadened band.

$v$ = frequency of the modulating field, and $n$ = an index with $n=0, \pm 1, \pm 2$, In addition, the absorption of the initial absorption line 10 and of each of these side band lines have A.C. components (represented by the double-headed arrows at the top of each line) at the modulation frequency and also at harmonics of the modulation frequency. The extent of these modulations depends on the applied field again through Bessel Function relationship. In actual gases, the Doppler broadening effect is always present, and the net effect of A.C. Stark modulation is that illustrated in FIG. 3b, where curve 18 represents the Doppler-broadened line without an A.C. field applied to the gas, and the vertical bars 20 represent the absorption band with an A.C. component when an A.C. field is applied.

Ordinarily, A.C. modulation at the fundamental modulation frequency is quite small. The light beam intensity is primarily modulated at twice the modulation frequency of the applied electric field. This situation is avoided by imposing a D.C. bias field on the gas and imposing the A.C. field on top of this D.C. field. Another effect of the D.C. field is to widen the radiation frequency range in which A.C. modulation may be obtained.

Some typical gas and light wavelength combinations are listed as follows:

| GAS | LIGHT WAVELENGTH (microns) |
|---|---|
| 1,1 difluoroethylene | 10.611 |
| Methyl Chloride $CH_3Cl$ | 9.606 |
| Vinyl Chloride $C_2H_3Cl$ | 10.531, 10.550, 10.570, 10.590, 10.652, 10.673 |

Other gases suitable for the infrared range 1,1'-difluoroethane, methyl iodide, ethyl iodide, fluorotrichloromethane, chlorotrifluoromethane, dichlorobenzene, 3-methyl-cyclobexanol, isobutyl methacrylate, isopropyl pyridine, p-anisidine, 2-bromo-5-nitrophenol, 1,2-dibromobutane, acetyl bromide, 2-chloroethanol, acetic acid isobutyl ester, 2-propanol, vinyl isopropyl ether, 2-methyl-2,4 pentanediol, 2-butanone, isobutyraldehyde, isobutyric acid, and others falling in the class of molecular gases having non-linear molecules with permanent dipole moments.

Figure 4:
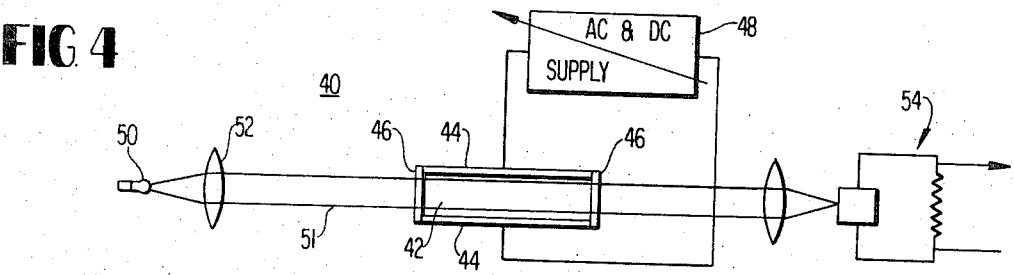
FIG. 4 is a schematic diagram of one form of a gas Stark effect light switching or modulating system according to the present invention.

FIG. 4 illustrates one form of a Stark effect gaseous light modulator 40 embodying this invention. The modulator consists of a gas cell 42 in the form of a parallel plate capacitor with two conducting metallic plates 44 to serve as the electrodes. For a given wavelength of light, the cell is filled with the appropriate molecular gas with a) the correct symmetry, i.e., symmetric top or asymmetric top, b) permanent dipole moment and c) with absorption nearly resonant with the wavelength of the incident infrared light. The pressure of the gas is adjusted so that there is enough gas for modulation purposes but not so much that the lines are excessively pressure broadened. In practice, it is found that for gases, such as 1,1 difluoroethylene and vinyl chloride, optimum pressure values are in the range of 1–3 Torr. The windows 46 complete the enclosed gas cell and may be rock salt, GaAs or TI (Texas Instrument) glass which are transparent in the infrared region. For polarized light these windows may be placed at Brewster angles, but for nonpolarized light anti-reflection coatings may be used to reduce reflectance losses. A power supply and amplifier 48 is used to supply the D.C. bias field voltage as well as the A.C. modulation field signal. As discussed above, the D.C. field may be eliminated. The light source 50 may be an incoherent light source or a laser producing an infrared light beam 51. In either case optical components, such as beam expanders or collimators 52, are used to shape the beam to the appropriate size suitable for passage through the gaseous electro-optic cell.

Variation of the electric field applied to the gas via electrodes 44 changes the transmissivity of the cell and hence the intensity of the light reaching a light detector or receiver 54. Needless to say, this modulator system is of use only if the A.C. modulation is clearly exhibited in the detected signal above the noise level. The limitations of this type of operation are that the field must not exceed the breakdown voltage which is of the order to say 3–50kilovolts/cm, and the power of the input light beam must not be so high as to saturate the transition of interest. The likelihood of saturation can be reduced by circulating the gas through the beam path. More effective modulation can be obtained by passing a beam through the same cell several times in a multipath configuration.

Figure 5:
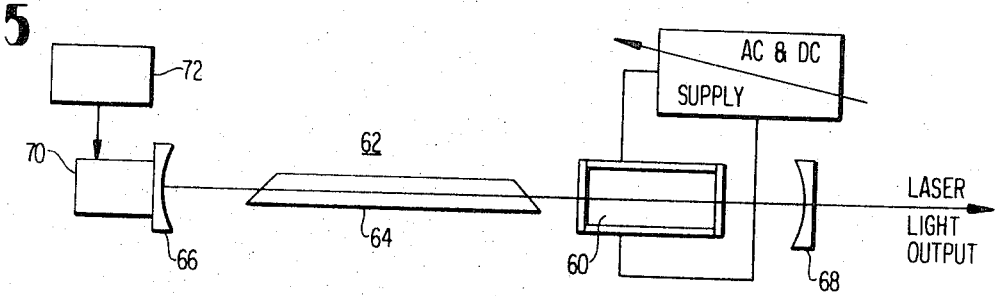
FIG. 5 is a schematic diagram of another embodiment of the invention in the form of a Q-switched laser incorporating a controllable gas Stark effect loss modulator.

Another embodiment of this light switching system is shown in FIG. 5 as a Q-switched laser operating in the aforementioned low frequency range and incorporating a Stark cell as an active Q-spoiler or loss modulator. In this embodiment, a gaseous Stark cell 60 is placed in the cavity of a laser cavity 62 including a $CO_2$ laser gain cell 64, the cavity mirrors 66 and 68, an optional piezoelectric crystal driver 70 for moving mirror 66 by minute amounts, and a power supply 72 for driving the piezoelectric crystal. The cell 60 may be of the same construction as that shown in FIG. 4 and is driven by a power supply and amplifier 74 which applies the A.C. modulating voltage and D.C. bias for producing the modulating and bias fields, respectively, to the gas. Variation of the loss in the Stark cell by a small amount results in a large depth of modulation in the output of the laser. The limitation for this embodiment is that the inverted population density, and therefore the gain, of the laser medium is no longer at a steady state but will react in a complicated manner with the changing intensity of the light in the cavity. This and the fact that the cavity cannot adjust at a rate faster than that imposed by the Q of the cavity results in a drop in the depth of modulation as the frequency of modulation is increased. However, the Q of $CO_2$ laser cavities can be quite low and 1/Q can be quite high. To make an estimate of cutoff frequency of the passive cavity, i.e., the cut-off frequency of the laser cavity when it is without gain, consider a mirror 68 with ten percent transmissivity and a cavity one meter long. It is clear that the light intensity I in the cavity would decay according to the equation:

$$dI/dt = 3 \times 10^7 I$$

and the system would work up to approximately 10 megaHz.

Figure 6A:
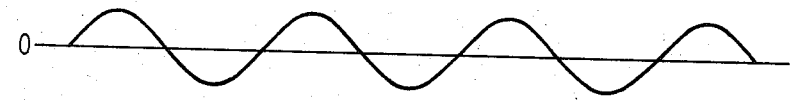
FIGS. 6a, 6b, 6c, and 6d illustrate waveforms associated with a Q-switched laser employing a Stark effect loss modulator.
Figure 6B:
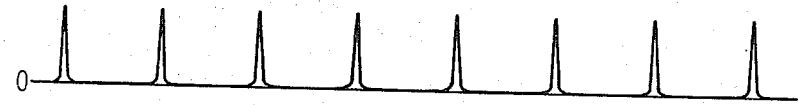

The intensity of the output of a $CO_2$ laser operating under such circumstances, but without a D.C. bias field, is shown in FIG. 6b. In particular, the depicted behaviour is that of a $CO_2$ laser operating at the P(26) line of the 9.6 micron transition with a Stark cell 30 cms. long containing methyl chloride gas at a pressure of approximately 2 Torr in the cavity. The laser gain cell was 80 cms. long, the laser cavity length was 142 cms. and a diffraction grating was used to select the transition used. The gas fill was approximately 2 Torr He, 2 Torr $CO_2$, 7 Torr $N_2$, and 0.5 Torr $H_2$. Rock salt Brewster angle windows were used. The waveform of the A.C. driving voltage is shown in FIG. 6a and the Q-switched laser output pulses are shown in FIG. 6b. This illustrates that in Q-switched operation, the waveform of the pulses does not follow that of the modulation field but one should note similar results may be obtained even if the modulating field is not harmonic. For these particular circumstances, and for a purely A.C. field (i.e., with no D.C. bias field on the Stark cell), a peak-to-peak voltage of 200 volts/cm. at a frequency of 1–100 KHz, produced a pulsed output of 0.5 microsecond duration of high intensity. The efficiency of this method is very high so that the peak power turns out to be very nearly equal to the average power divided by N the number of pulses per second and by $\tau$ the duration of the pulse. In the case of A.C. fields alone, the laser output pulse rate is double that of the A.C. switching field, as shown in FIG. 6b.

Figure 6C:
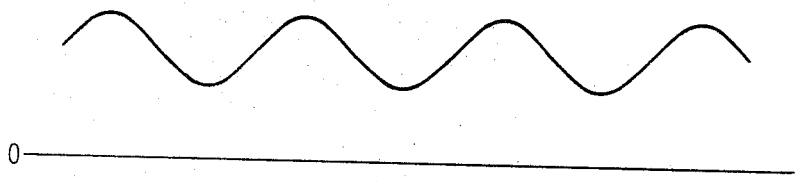
Figure 6D:
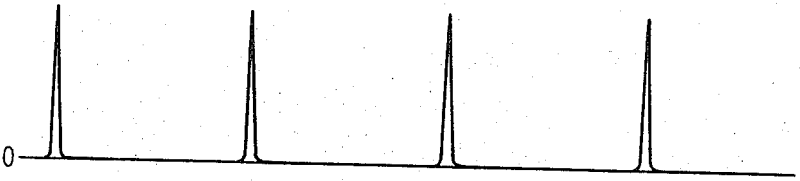

However, a D.C. field may be used in conjunction with the A.C. field (FIG. 6c) to produce pulses (FIG. 6d) at the same frequency as the switching field. This also has the additional advantage of producing pulses of higher peak power, namely twice as much as produced when only an A.C. field is used. The amplitude of the D.C. field needs to be greater than one-half of the peak-to-peak A.C. voltage, otherwise intermediate pulses of lower intensity will be obtained also. In practice, the combined effect of the D.C. and the A.C. fields can be accomplished with the use of a pulsed Stark field. Electrically, this would be equivalent to a D.C. field together with a (nearly) square wave A.C. field superimposed on it. The nature of Q-switching dictates that the inverted population can be increased sufficiently during the "off" period to allow for high rate of "dumping" or increase in cavity field after the Q is switched from the low (lossy) to the high condition. It is clear that this invention provides for the mechanism of changing the cavity Q significantly and rapidly. However, the extent to which effective Q switched laser operation is obtained depends also on how the laser gain tube is operated. The determination of the optimum conditions for that operation is obvious to those skilled in the art and involves the variation of parameters such as the length of the gain tube, the magnitude of the plasma discharge current, and transmissivity of the cavity mirrors.

Figure 7:
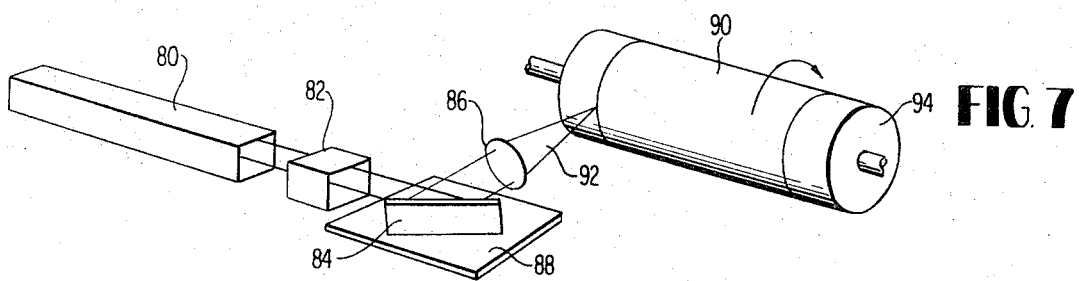
FIG. 7 is a schematic diagram of a novel heat printing system including the Stark modulator.

FIG. 7 illustrates a heat printing system comprising a Stark modulator 80, a moderately powered $CO_2$ laser 82, mechanical and optical arrangements including a movable mirror 84, a lens 86, and a movable platform 88, for scanning a sheet of paper 90 bearing characters. The novelty of the system lies in the high frequency light switching rate (up to and exceeding 2 megaHz), the ability to handle fairly intense beams (100 milliwatts or more) at these high rates and also in the method of using the infrared beam 92 to bake pigment onto ordinary paper. The printing cycle consists of spraying a thin layer of tones or pigment or encapsulated ink onto the plain sheet of paper. The paper or document 90 is secured around a rotating drum 94, and the controlled laser beam scans the paper, baking on the ink whenever called for to produce a character. After completion of the baking process, the excess unbaked pigment is removed by vacuum or other processes and the document is removed from the drum. This process has the advantages of using ordinary paper and providing good resolution, and is rapid.

The Stark modulator and the Q-switched laser can also be used to perform controlled machining operations for control information up to several hundred megaHz.

The foregoing description has disclosed a novel light modulator employing the Stark effect exhibited by a certain class of gases and providing light intensity modulation at frequencies higher than that obtainable by mechanical means, i.e., higher than 0.5 MHz. Such modulators may be operated in the linear low frequency range using the D.C. Stark effect or in the non-linear high frequency range employing the A.C. Stark effect. Another important embodiment in the low frequency range is a novel Q-switched laser incorporating a controllable Stark effect Q-spoiler or loss modulator for producing short high peak power laser pulses from a low average power laser gain tube.

While the invention has been particularly shown and described with reference to preferred embodiments thereof, it will be understood by those skilled in the art that various changes in form and details may be made therein without departing from the spirit and scope of the invention.

We claim:

1. A Stark effect infrared light gas modulator for intensity modulating a substantially monochromatic infrared light beam at a frequency greater than 0.5 MHz comprising:
   a. a volume of molecular gas having non-linear molecules with permanent dipole moments, said gas having a pressure-broadened natural absorption line,
   b. means for directing through said volume of gas an infrared light beam, and
   c. means for exciting said gas with a varying electric field having a frequency greater than 0.5 MHz and no greater than the pressure-broadened bandwidth of the natural absorption line, whereby the intensity of said light beam is modulated by said electric field, and the intensity modulation is non-dispersive and is linear with respect to the strength of said field.

2. A Stark effect infrared light modulator as defined in claim 1 wherein said varying electric field is alternating, and said intensity of said light beam is modulated at a frequency equal to twice the frequency of said electric field.

3. A Stark effect infrared light modulator as defined in claim 1 wherein said varying electric field is unidirectional so that the intensity of said light beam is modulated at the frequency of said field.

4. A Stark effect infrared light modulator as defined in claim 3 wherein said varying electric field is in the form of pulses.

5. A Stark effect infrared light modulator as defined in claim 1 wherein said varying electric field is alternating and further comprising means for exciting said gas with a D.C. bias electric field so that the composite electric field applied to said gas is unidirectional, whereby said infrared light beam is modulated at the frequency of said alternating electric field.

6. A Stark effect infrared light modulator as defined in claim 1 further comprising a laser cavity including a laser for producing said infrared light beam, said volume of gas being located in said cavity in the path of said light beam.

7. A Stark effect infrared light modulator as defined in claim 6 wherein said laser is a $CO_2$ laser.

8. A Stark effect infrared light modulator as defined in claim 7 wherein said gas is 1,1 difluoroethylene.

9. A Stark effect infrared light modulator as defined in claim 7 wherein said gas is 1,1' difluoroethane.

10. A Stark effect infrared light modulator as defined in claim 7 wherein said gas is vinyl chloride.

11. A Stark effect tunable absorber comprising:
   a. a volume of molecular gas having non-linear molecules with permanent dipole moments, said gas having a pressure-broadened natural absorption line, and
   b. means for exciting said gas with a varying electric field having a frequency greater than the bandwidth of said natural absorption line to form a plurality of split absorption lines having a frequency separation equal to the frequency of the exciting field, so that each of said split lines varies in absorption at said frequency and harmonics thereof and the absorber is tuned in accordance with the exciting field frequency, whereby the ratio of the variations in absorption to the means absorption of each said split line is less than one percent.

12. The method of intensity modulating a substantially monochromatic infrared light beam at a frequency greater than 0.5 MHz comprising the steps of:
   a. providing a volume of molecular gas having non-linear molecules with permanent dipole moments, said gas having a pressure-broadened natural absorption line;
   b. directing through said volume of gas an infrared light beam; and
   c. exciting said gas with a varying electric field having a frequency greater than 0.5 MHz and no greater than the bandwidth of the pressure-broadened natural absorption line, whereby the intensity of said light beam is modulated by said electric field and the intensity modulation is non-dispersive and is linear with respect to the strength of said field.

13. The method as defined in claim 12, wherein said varying electric field is alternating, and further comprising the step of exciting said gas with a D.C. bias electric field so that the composite electric field applied to said gas is unidirectional, whereby said infrared light beam is modulated at the frequency of said alternating electric field.

14. The method of tuning a Stark effect absorber which includes a volume of molecular gas having non-linear molecules with permanent dipole elements and having a pressure-broadened natural absorption line, the method comprising the steps of:
   exciting said gas with an alternating electric field having a frequency greater than the bandwidth of said natural absorption line to form a plurality of split absorption lines having a frequency spacing equal to the exciting frequency so that each said split absorption line varies in absorption at the exciting frequency and harmonics thereof, whereby the ratio of the variations in absorption to the mean absorption of each said split absorption line is less than one percent.

* * * * *

UNITED STATES PATENT OFFICE
CERTIFICATE OF CORRECTION

Patent No. 3,842,372                Dated October 15, 1974

Inventor(s) Yoh-Han Pao et al

It is certified that error appears in the above-identified patent and that said Letters Patent are hereby corrected as shown below:

In the Heading:

The Assignee's name is incorrect, Should be:

-- QUANDIA CORPORATION --

Signed and sealed this 13th day of May 1975.

(SEAL)
Attest:

RUTH C. MASON
Attesting Officer

C. MARSHALL DANN
Commissioner of Patents
and Trademarks